Figure 1:
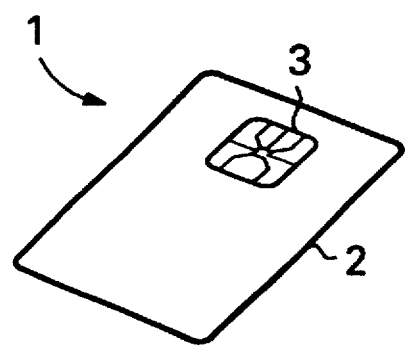

United States Patent [19]

Pedersen

[11] Patent Number: 5,739,511
[45] Date of Patent: Apr. 14, 1998

[54] METHOD FOR EFFECTING AN ELECTRONIC PAYMENT TRANSACTION HAVING A VARIABLE NUMBER OF PAYMENT UNITS, AS WELL AS PAYMENT MEANS AND SYSTEM FOR APPLYING THE METHOD

[75] Inventor: Torben P. Pedersen, Åbyhøj, Denmark

[73] Assignee: Koninklijke PTT Nederland N.V., Groningen, Netherlands

[21] Appl. No.: 644,949

[22] Filed: May 13, 1996

[30] Foreign Application Priority Data

May 11, 1995 [NL] Netherlands ............... 1000341
Oct. 9, 1995 [NL] Netherlands ............... 1001376

[51] Int. Cl.$^6$ ............... G06K 5/00; G06F 17/60; G07D 7/00
[52] U.S. Cl. ............... 235/380; 340/825.31; 235/37 C
[58] Field of Search ............... 235/486, 380, 235/382, 379, 375, 492, 487; 340/825.31–825.35

[56] References Cited

U.S. PATENT DOCUMENTS

| | | | |
|---|---|---|---|
| 4,219,151 | 8/1980 | Haruki | 235/379 |
| 4,507,745 | 3/1985 | Agrawal | 364/709 |
| 4,799,061 | 1/1989 | Abraham et al. | 340/825.34 |
| 5,214,579 | 5/1993 | Wolfberg et al. | 364/408 |
| 5,225,664 | 7/1993 | Iijima | 235/380 |
| 5,247,578 | 9/1993 | Pailles et al. | 380/24 |
| 5,285,400 | 2/1994 | Stent et al. | 364/709.14 |
| 5,293,029 | 3/1994 | Iijima | 235/380 |
| 5,495,098 | 2/1996 | Pailles et al. | 235/380 |
| 5,528,231 | 6/1996 | Patarin | 340/825.34 |
| 5,619,573 | 4/1997 | Brickmeyer et al. | 380/23 |

FOREIGN PATENT DOCUMENTS

| | | |
|---|---|---|
| 0 265 728 | 5/1988 | European Pat. Off. . |
| 0 459 781 | 12/1991 | European Pat. Off. . |
| 0 496 656 | 7/1992 | European Pat. Off. . |
| 0 507 669 | 10/1992 | European Pat. Off. . |

*Primary Examiner*—Donald T. Hajec
*Assistant Examiner*—Thien Minh Le
*Attorney, Agent, or Firm*—Oblon, Spivak, McClelland, Maier & Neustadt, P.C.

[57] ABSTRACT

The invention relates to a method for protected payment with electronic payment device, such as "intelligent" payment cards ("smart cards"), in a variable number of steps. In this connection, use is made of a non-reversible function, of which successive function values are provided by the payment device to the payment station in question by way of proof of payment. On the basis of these function values, there may take place both a verification and a determination of the number of steps. Such method finds application, e.g., in public telephones and in copiers. The invention further relates to a payment device and a payment system for applying the method.

13 Claims, 3 Drawing Sheets

METHOD FOR EFFECTING AN ELECTRONIC PAYMENT TRANSACTION HAVING A VARIABLE NUMBER OF PAYMENT UNITS, AS WELL AS PAYMENT MEANS AND SYSTEM FOR APPLYING THE METHOD

BACKGROUND OF THE INVENTION

The invention relates to a method for effecting, with an electronic payment means, a variable number of payments in one payment transaction. More in particular, the invention relates to a method for effecting a payment transaction with an electronic payment means and a payment station, comprising the issuing by the payment means to the payment station of at least a first payment value, payment values being representative for one or more payment units to be settled. Such a method is known, e.g. from European Patent Application EP-A-0,637,004.

There are many types of payment transactions in which a variable number of payment units must be transferred. Thus, in a telephone booth, for a single conversation in most cases several units, corresponding with metering pulses (so-called "ticks"), should be debited against a payment card. These units are credited to the telephone set of the telephone booth. In the event of copiers, for a copying order a certain amount per page should be paid, with such amount being capable of being debited against a payment card. Within a single transaction (telephone conversation or copying order), therefore, a debiting of the payment means (i.e., the payment card) and a crediting of a payment station (telephone set or copier) must repeatedly take place.

In the event of modern, protected payment means, such as so-called "smart cards" or "chip cards", a protocol is applied to each debiting of the payment means (debit), in which the authenticity of the payment means and of the electronic money used is verified. An example of a verification schema using blind signatures is disclosed in European Patent Application EP-A-0,518,365. Another scheme to verify electronic money is disclosed in European Patent Application EP-A-0,507,669, where payment units are provided with random "sequence numbers". Verification of the electronic money is effected by checking received sequence numbers against a list of issued sequence numbers. However, this type of verification still allows the electronic money to be duplicated and to possibly be spent more than once.

A verification, however, for each payment unit (metering pulse or copying price per page) requires a certain processing time. In the event of, e.g., international telephone conversations, where the metering pulses (or ticks) follow each other rapidly, the processing of the payment units may give rise to problems and obstruct the execution of a protected payment.

In order to solve this problem, prior to the actual transaction several payment units might already be transferred from the payment means to the payment station. This has the drawback that restitution should take place in the event that not all payment units are used up. Payment afterwards, i.e., the transfer of payment values from the payment means to the payment station following the transaction, has the drawback that the payment may be sabotaged by removing the payment means (i.e. the smart card) prematurely.

SUMMARY OF THE INVENTION

The object of the invention is to eliminate the above and other drawbacks of the prior art, and to provide a method which enables the effecting of a protected payment in a simple and rapid manner with a variable number of payment units, i.e. a number of payment units to be determined during the transaction.

Another object of the invention is to provide a method which allows a secure payment involving a minimal amount of processing time.

For this purpose, a method of the type referred to in the preamble is characterised in that the payment values are mutually related by a one-way function, in such a manner that the first payment value may be obtained from a further payment value by repeatedly applying the function. By applying a one-way function, i.e., a function of which the inverse cannot viably be determined, a very suitable check on the progress of the payment transaction may be obtained without the need to repeatedly execute a complicated and therefore time-consuming verification process.

After receiving a payment value, the payment station preferably checks, by applying the function, whether the payment value received is correct. This is possible since repeated application of the function produces the first payment value.

After receiving a payment value the payment station, by applying the function repeatedly, may additionally determine how many payment units the payment value received represents. Per payment transaction one or more payment values may be transferred, a (last) payment value possibly representing several (previous) payment values. The number of times the function must be applied to obtain the preceding or first payment value, is directly related to the number of payment values generated, but does not have to be equal to the number of issued and thus transferred payment values.

Together with at least the first payment value, authentication data is advantageously transferred from the payment means to the payment station. This authentication data, such as the identification code of the payment means and/or the user, may be contained in the first payment value or precede it.

In a further embodiment of the method according to the invention, the payment station, after receiving a payment value, transfers a debit value to the payment means. The debit values may be used, directly after having been received by the payment means, for debiting a balance, e.g., by lowering a counter reading present in the payment means. It is also possible, however, that after having been received by the payment means the debit values are collected and, at the end of the payment transaction, are used for debiting a balance. In the latter case, the method may progress more rapidly.

In yet a further embodiment of the method according to the invention, together with the debit value a count value is transferred from the payment station to the payment means, which count value represents the number of payment units to be debited. The count value may be one, but may also be greater than one, so that several payment units are debited simultaneously. The count value may furthermore have been determined in advance, or be variable. Preferably, the count value is related to the number of times the one-way function is applied, e.g., to obtain the preceding or the first payment value.

In a yet another embodiment of the method in accordance with the invention the issued payment values are used as proof in a settlement process to be carried out later. In this case, with the issued payment value(s) a payment is laid down while the settlement of payment can take place at another time. Such a settlement can for example result in a summary invoice.

The method according to the invention enables to adjust as needed, during the transaction, the number of payment values and thus the number of payment units to be settled.

EXEMPLARY EMBODIMENTS

The invention will be explained in greater detail below with reference to the Figures.

FIG. 1 shows a smart card as may be used in the method of the present invention.

Figure 2:
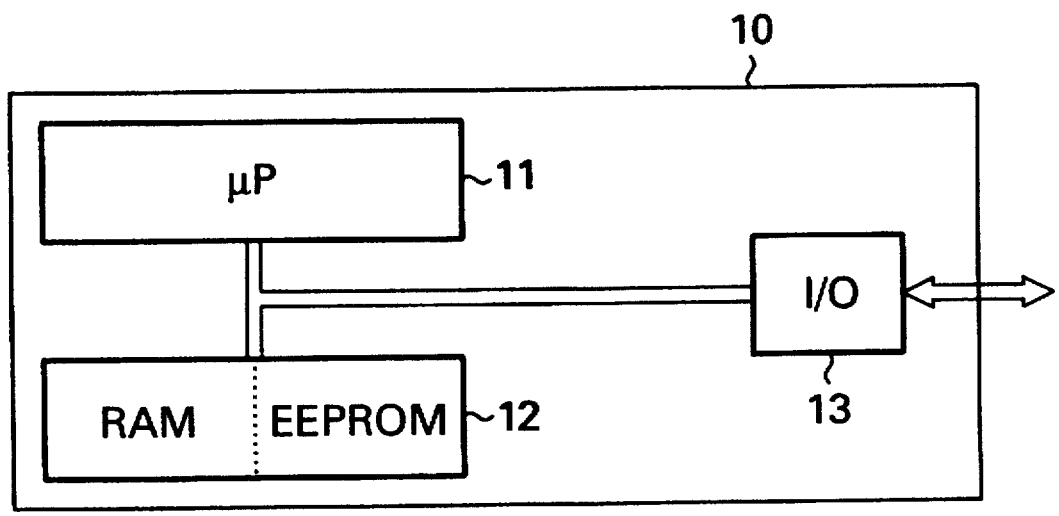

FIG. 2 schematically shows the integrated circuit of the smart card of FIG. 1.

Figure 3:
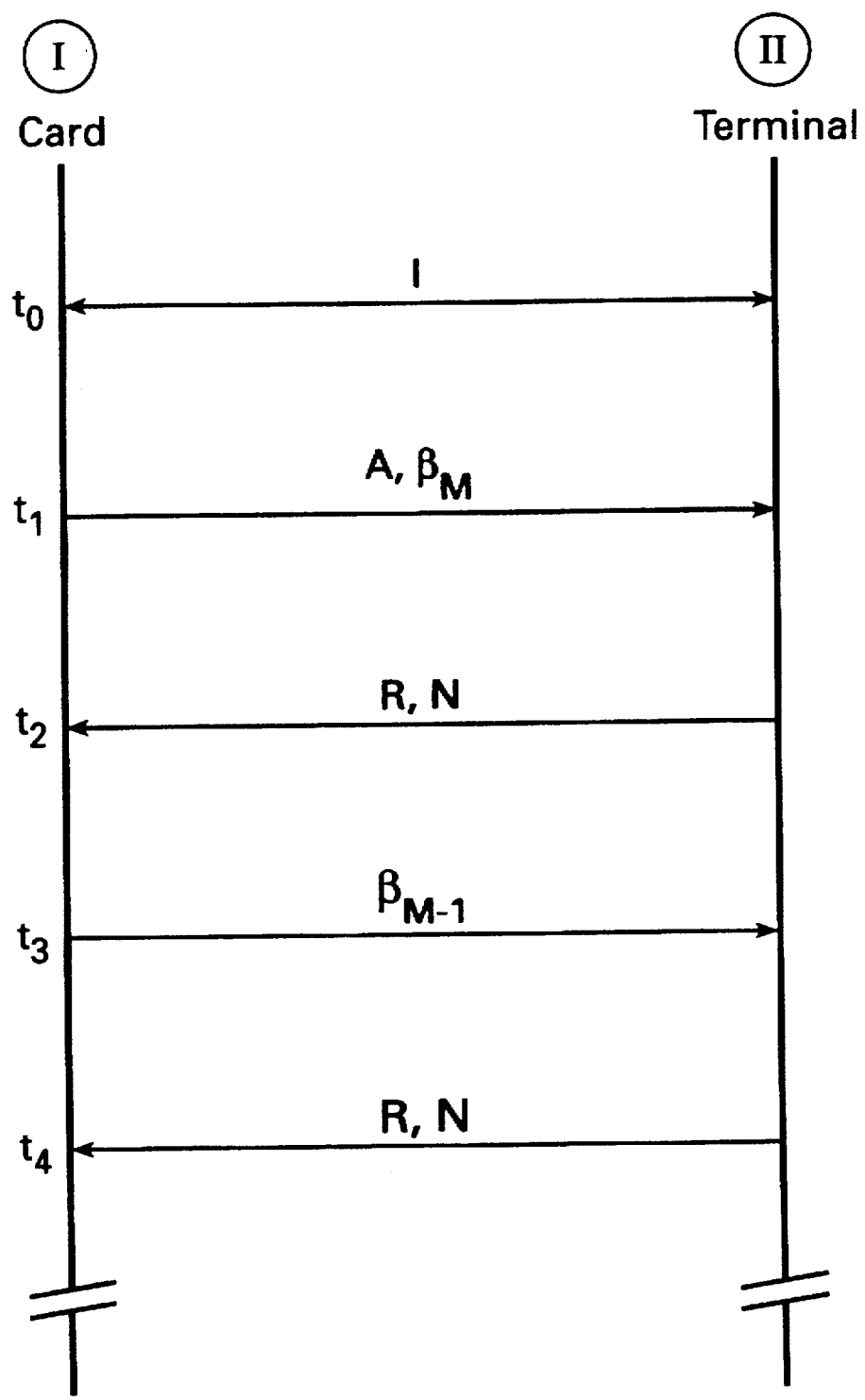

FIG. 3 schematically shows a preferred embodiment of the method according to the invention.

Figure 4:
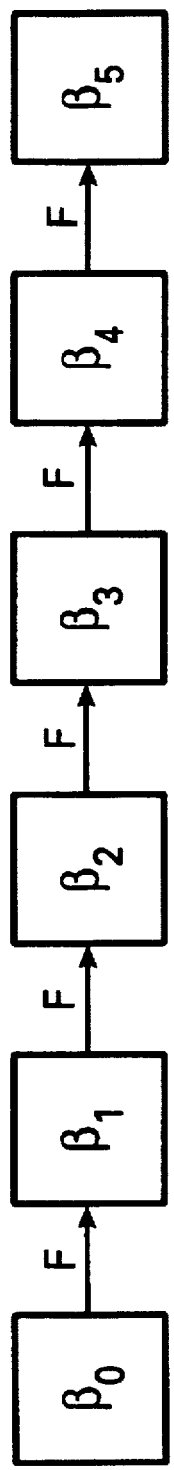

FIG. 4 schematically shows successive function values of a one-way function.

The smart card or IC card 1 shown by way of example in FIG. 1 comprises a substrate 2, in which an integrated circuit is embedded. The integrated circuit is provided with contacts 3 for contacting a card reader or the like. It should be noted that the present invention can also be applied in the case of so-called contactless smart cards.

The integrated circuit 10 shown schematically and by way of example in FIG. 2 comprises a processor 11, a memory 12 and an input/output circuit 13. The memory may comprise a volatile (RAM) memory part for temporarily storing data and a non-volatile (ROM) memory part for permanently or semi-permanently storing data. The latter part is preferably an EEPROM type memory. The data stored in the non-volatile part may contain both programming data (instructions, programs) and payment data, i.e. data relating to monetary transactions. It will be understood that a separate memory (not shown) may be provided to store the instruction set of the processor 11. The input-output circuit 13 may communicate with external devices via contacts (not shown in FIG. 2), such as the contacts 3 shown in FIG. 1. The integrated circuit 10 may be contained in the card 1 of FIG. 1.

In FIG. 3, there is schematically shown, by way of example, an embodiment of the method according to the invention. A payment means (paying party) is referred to by I, and a payment station or terminal (receiving party) is referred to by II. Between the payment means I and the payment station II, during a payment transaction an exchange of data takes place. It will be understood that the payment means (card) I may correspond with the smart card 1 shown in FIG. 1.

At the time $t_0$, there may take place an exchange of initialisation values I (or Init). This exchange, which inter alia may relate to the identity of the paSnnent station and/or the payment means, the type of transaction and the like, is not essential to the present invention.

At the time $t_1$, the payment means (card) I sends an authentication value A and a first payment value $\beta_M$ to the payment station (terminal) II. The payment value $\beta_M$ may, like the debit value R, be contained in the authentication value A or may be determined by the authentication value A, e.g. when A is constituted by a digital signature on $\beta_M$, R and other transaction data. The payment value $\beta_M$ need therefore not constitute a separate value.

After authentication, the payment station provides access to the desired service or the desired product and saves the authentication value A and the payment value $\beta_M$ as proof of payment, e.g. vis-à-vis a banking institution. Alternatively, $\beta_M$ or one or more possible subsequent values $\beta_{M-1}$, $\beta_{M-2}$, . . . , may serve as proof to later collect money from a consumer (compare so-called credit cards). In his context it should be noted that the settlement of the transaction is, in principle, independent of the transaction proper and may be carried out at another time and another place.

At the time $t_2$, the payment station II sends a debit value R to the payment means, possibly accompanied by a count value N. The count value N may have a previously determined fixed value, e.g., one. In this case, the transfer of the count value N may be dispensed with, or maybe effected only once (time $t_2$).

On the basis of the debit value R, one or more payment units are debited against a balance on the card, e.g., by lowering a counter reading (see also e.g. EP-A-0,637,004). This number of payment units to be debited may be predetermined, or may be referred to by the count value N. Also the debit value R may be predetermined, because of which R is redundant and maybe dispensed with. Instead of $R_1$, or R and N, a generic debit signal may be transferred. The debiting may take place directly or shortly after the time $t_2$, or may be postponed till the end of the transaction. In the latter case, the payment means will be constructed in such a manner that this debiting takes place even if the transaction is prematurely interrupted.

As a reaction to the receipt of the debit value R, or as a reaction to the receipt of an interim request (not shown in FIG. 3) from the payment station, at the time $t_3$ the payment means I sends a further payment value, $\beta_{M-1}$, to the payment station II. In the payment station II, A and $\beta_{M-1}$ are now saved as proof of payment. In addition, $F(\beta_{M-1})$ is calculated; in other words, $\beta_{M-1}$ is subjected to the function F. If the result of this operation indeed produces $\beta_M$, not only has a check on the authenticity of $\beta_{M-1}$ been effected, but the number of payment values is also determined: the total number of payment values is equal to the number of operations required to obtain $\beta_M$ plus one. It follows that in the event of receiving a payment value $\beta_{M-x}$ the value of x may be determined by applying the function F x times. Thus, the count value N may be adjusted on the basis of the value of x found. This will be explained later with reference to FIG. 4.

At the time $t_4$, a further debit value R is transferred from the payment station II to the payment means I, possibly together with a count value N. The payment means carries out similar operations as at the time $t_2$.

After the time $t_4$, further similar steps may be carried out, or the transaction may be terminated. The transaction will be terminated anyway after the last payment value $\beta_0$ has been transferred. Possibly, an acknowledgement of the termination of the transaction may be transferred from the payment station II to the payment means I. This is not further indicated in FIG. 3.

As is explained above, the number of payment units to be debited is variable and may depend on the duration of the transaction, inter alia.

In summary, the method according to the invention, at any rate if use is made of debit values, comprises the following steps:

1. The payment means sends a value $\beta$ to the payment station.
2. The payment station sends a debit value to the payment means.
3. The payment means sends a value of ($\beta'$) derived from $\beta$, determined with the help of the one-way function, to the payment station.
4. The payment station checks whether the received value $\beta'$ is indeed a value derived from $\beta$.

5. If the transaction has not been terminated, $\beta$ is replaced by its derived value $\beta'$, and the process continues at step 2. The derived value referred to here is always the value $\beta'$ for which: $F(\beta')=\beta$, i.e. the value "preceding"$\beta$.

It should be noted that the method described above may also be terminated after step 2, that is in case only one payment unit, such as a telephone tick (metering pulse), is to be transferred.

The payment values $\beta$ referred to above may each represent one payment unit, such as a telephone tick, currency unit or calculation unit. It is also possible, however, that each payment value represents several payment units, or that different payment values represent different numbers of payment units. This may be recorded in the authentication value A. The first payment value may e.g. represent a base rate of several (e.g., two or three) payment units, while further payment values always represent one payment unit. In this manner, a differentiation may be made between, e.g., the set-up costs and the duration costs of a telephone connection. The payment values consist of numbers which are transferred in the form of electrical, optical or acoustical signals.

The so-called one-way function F per se is simple to calculate, but the inverse ($F^{-1}$) cannot viably be determined. This is understood to mean that in practice it is extremely unlikely that a value $\beta_{M-1}$ may be determined from a value $\beta_M$. Such a one-way function, known per se from cryptography, may be constructed, e.g., by involution modulo a certain number, in which that specific number may be a so-called "Blum integer", i.e. a product of two large prime numbers in a special form. A so-called "hash" function may also be applied.

In FIG. 4, the application of the one-way function is further illustrated with reference to an example. In this example, M is equal to 5 (see also FIG. 3), so that the first payment value is $\beta_5$. In practice, M will have a much greater value, e.g., 255.

A value $\beta_i$ (i=0 ... 5) may simply be calculated from the value $\beta_{i-1}$ by applying the one-way function F: $F(\beta_{i-1})=\beta_i$. Conversely, it is very difficult to determine the inverse of F, so that in practice it is not viable to determine the value $\beta_{i-1}$ from $\beta_i$. In the method according to the invention, this provides a form of guarantee: the payment station is able to check whether the value $\beta_i$ is correct and what is the (relative) value thereof by applying the function F several times. Conversely, the payment station itself is not able to calculate the next payment value, which represents a greater number of payment units.

As may be seen from FIG. 4, the value $\beta_5$ may be obtained from $\beta_2$ by applying the function F three times. If the payment station first receives $\beta_5$ and then $\beta_2$, it may therefore be determined that $\beta_2$ is the fourth payment value (relative to $\beta_5$) and, e.g., represents four payment units (i.e. the units associated with $\beta_5$ plus $\beta_4$ plus $\beta_3$ plus $\beta_2$). In response thereto, e.g., a count value N=4 may be transferred to the payment means in order to debit four payment units at once. If no value $\beta_5$ results after the function F has been applied at most M (in this case 5) times to $\beta_2$, it may be concluded that the most recently received value (i.c. $\beta_2$) is invalid, as the values $\beta_5$ and $\beta_2$ are apparently not related by F.

The possession of a valid $\beta_2$ therefore demonstrates that the receiver (the payment station) is entitled to payment units corresponding to four payment values: $\beta_2$ through $\beta_5$. These may be four payment units but, e.g., also four times C payment units, where C is a conversion factor.

As explained above, the use of a one-way function provides a simple and rapid method for effecting payments with a variable number of payment units. This may not only be advantageous in the case of telephony, but for example also in the case of vending machines, taximeters, and other devices where the amount to be settled can be dependent on the time duration.

The payment values issued need not be settled, for example by means of debit values, during or immediately afterwards a transaction with a payment means, but may be used as proof in a settlement process to be carried out at a later time. In this case a payment is laid down with the issued payment means, while the settlement of the payment can take place at a later time (incontestable charging). Such a settlement may for example result in a summary invoice with several transactions being settled in one settlement process. Using payment values as proof for settlements afterwards, can for example be used with mobile telephone and video distribution services (video-on-demand).

The invention may be applied with or without so-called electronic "cheques" comprising an electronic "signature" (e.g., a cryptographic operation with a specific key on certain data) of the bank and/or the user.

It will be understood by those skilled in the art that the invention is not limited to the embodiments shown, and that many modifications and amendments are possible without departing from the scope of the invention.

I claim:

1. Method for effecting a payment transaction with an electronic payment means and a payment station, comprising the issuing by the payment means to the payment station of at least a first payment value, payment values being representative for one or more payment units to be settled, each subsequent payment value being related to the first payment value by a one-way function in such a manner that the first payment value may be obtained from a further payment value by repeatedly applying the function.

2. Method according to claim 1, wherein the payment station, after receipt of a payment value, checks by applying the function whether the payment value received is correct.

3. Method according to claim 1, wherein the payment station, after receipt of a payment value, determines by applying the function how many payment units the payment value received represents.

4. Method according to claim 1, wherein authentication data is transferred together with at least the first payment value from the payment means to the payment station.

5. Method according to claim 1, wherein the payment station, after receipt of a payment value, transfers a debit value to the payment means.

6. Method according to claim 5, wherein debit values are used, directly after receipt by the payment means, for debiting a balance.

7. Method according to claim 5, wherein debit values, after receipt by the payment means, are collected and, at the end of the payment transaction, are used for dehiring a balance.

8. Method according to claim 5, wherein a count value is transferred, together with the debit value, from the payment station to the payment means, which count value represents the number of payment units to be debited.

9. Method according to claim 8, wherein the count value is related to the number of times the one-way function has been applied.

10. Method according to claim 8, wherein the count value amounts to one.

11. Method according to claim 1, wherein the payment values issued are used as proof in a settlement process to be carried out later.

12. Payment means provided with an integrated circuit, the integrated circuit comprising a micro-processor and a memory, the micro-processor being programmed for effecting a payment transaction in which the payment means interacts with a payment station, a transaction comprising the issuing by the payment means to the payment station of at least a first payment value, payment values being representative for one or more payment units to be settled, each subsequent payment value being related to the first payment value by a one-way function in such a manner that the first payment value may be obtained from a further payment value by repeatedly applying the function.

13. System for electronic payments, comprising an electronic payment means, a payment station and a settlement station, the system being designed for effecting a payment transaction comprising the issuing by the payment means to the payment station of at least a first payment value, payment values being representative for one or more payment units to be settled, each subsequent payment value being related to the first payment value by a one-way function in such a manner that the first payment value may be obtained from a further payment value by repeatedly applying the function.

* * * * *

UNITED STATES PATENT AND TRADEMARK OFFICE
CERTIFICATE OF CORRECTION

PATENT NO. : 5,739,511
DATED : APRIL 14, 1998
INVENTOR(S) : TORBEN P. PEDERSEN

It is certified that error appears in the above-indentified patent and that said Letters Patent is hereby corrected as shown below:

Column 6, line 54, change "dehiring" to --debiting--.

Signed and Sealed this

Twenty-second Day of December, 1998

Attest:

BRUCE LEHMAN

*Attesting Officer*  *Commissioner of Patents and Trademarks*